US012806840B2

(12) United States Patent
Utsumi

(10) Patent No.: US 12,806,840 B2

(45) Date of Patent: Nov. 24, 2026

(54) INJECTION DEVICE, INJECTION MOLDING MACHINE, AND NOZZLE TOUCH METHOD

(71) Applicant: THE JAPAN STEEL WORKS, LTD., Tokyo (JP)

(72) Inventor: Satoshi Utsumi, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 38 days.

(21) Appl. No.: 18/705,583

(22) PCT Filed: Nov. 10, 2022

(86) PCT No.: PCT/JP2022/041977

§ 371 (c)(1),
(2) Date: Apr. 28, 2024

(87) PCT Pub. No.: WO2023/085377

PCT Pub. Date: May 19, 2023

(65) Prior Publication Data

US 2025/0010532 A1 Jan. 9, 2025

(30) Foreign Application Priority Data

Nov. 11, 2021 (JP) ................................ 2021-183864

(51) Int. Cl.

| | |
|---|---|
| ***B29C 45/80*** | (2006.01) |
| ***B29C 45/17*** | (2006.01) |
| ***B29C 45/62*** | (2006.01) |

(52) U.S. Cl.

CPC .......... *B29C 45/80* (2013.01); *B29C 45/1781* (2013.01); *B29C 45/62* (2013.01); (Continued)

(58) Field of Classification Search

CPC ................ B29C 45/1777; B29C 45/76; B29C 2945/76006; B29C 2945/76498

See application file for complete search history.

(56) References Cited

U.S. PATENT DOCUMENTS

| | | | |
|---|---|---|---|
| 5,147,659 | A | 9/1992 | Watanabe et al. |
| 2008/0088048 | A1 | 4/2008 | Hayakawa et al. |

(Continued)

FOREIGN PATENT DOCUMENTS

| | | | |
|---|---|---|---|
| CN | 211121717 | U | 7/2020 |
| EP | 3 047 955 | A1 | 7/2016 |

(Continued)

OTHER PUBLICATIONS

Extended European Search Report for European Patent Application No. 22892875.0, Jan. 15, 2025.

(Continued)

*Primary Examiner* — Thu Khanh T. Nguyen

(74) *Attorney, Agent, or Firm* — Potomac Law Group, PLLC

(57) ABSTRACT

An injection device includes a heating cylinder, a screw, a screw driving device, and a nozzle touch device. The screw driving device has a load cell configured to detect an injection pressure at a position separated from an extension line of an axis of the screw. When an injection nozzle is caused to touch a sprue of a mold by the nozzle touch device, a pressure of the load cell is monitored, and misalignment between the injection nozzle and the sprue is detected based on the pressure.

15 Claims, 9 Drawing Sheets

(52) U.S. Cl.
CPC ............... *B29C 2945/76006* (2013.01); *B29C 2945/76083* (2013.01); *B29C 2945/7619* (2013.01); *B29C 2945/76381* (2013.01)

(56) References Cited

U.S. PATENT DOCUMENTS

| | | | | |
|---|---|---|---|---|
| 2009/0011064 | A1 | 1/2009 | Satou | |
| 2017/0326770 | A1* | 11/2017 | Hirose ................ | B29C 45/1777 |

FOREIGN PATENT DOCUMENTS

| | | | |
|---|---|---|---|
| EP | 3173209 | B1 | 7/2018 |
| JP | H02-214631 | A | 8/1990 |
| JP | H07-106580 | B2 | 11/1995 |
| JP | 2004-306360 | A | 11/2004 |
| JP | 2014-091259 | A | 5/2014 |
| JP | 2014-226804 | A | 12/2014 |
| JP | 2016-135571 | A | 7/2016 |
| JP | 2018-122507 | A | 8/2018 |
| WO | 2006/054522 | A1 | 5/2006 |

OTHER PUBLICATIONS

Form PCT/ISA/237, Jan. 10, 2023.
International Search Report for International Patent Application No. PCT/JP2022/041977, Jan. 10, 2023.

* cited by examiner

INJECTION DEVICE, INJECTION MOLDING MACHINE, AND NOZZLE TOUCH METHOD

TECHNICAL FIELD

The present invention relates to an injection device configured to inject an injection material by causing an injection nozzle to touch a sprue of a mold, an injection molding machine including such an injection device, and a nozzle touch method.

BACKGROUND ART

An injection molding machine includes a mold clamping device for clamping a mold and an injection device for melting and injecting an injection material. The injection device includes a heating cylinder, a screw, a screw driving mechanism for driving the screw, and a nozzle touch device. An injection nozzle is provided at a tip end of the heating cylinder. When the nozzle touch device is driven, the entire injection device slides so that the injection nozzle can touch a sprue of the mold.

In a nozzle touch in which the injection nozzle is caused to touch the sprue of the mold, it is necessary to prevent so-called misalignment, which is misalignment between the center of the injection nozzle and the center of the sprue of the mold. Since the sprue is formed in a spherical shape, when the injection nozzle touches in a state where misalignment occurs, the injection nozzle is guided by a spherical surface and slides in a direction in which the misalignment is eliminated. According to the related art, at the time of nozzle touch, an observer is placed in the vicinity of the injection nozzle to observe the presence or absence of sliding of the injection nozzle and to check the presence or absence of misalignment. However, an observer is required, which increases the work cost.

Patent Literature 1 describes a detection method for detecting an abnormality in various nozzle touches. In the method described in the literature, a normal nozzle touch is performed in advance, and a change in touch force at this time is stored as a reference pattern. When the injection nozzle is caused to touch a sprue of a mold, a change in the touch force is measured. The measured change in touch force is compared with the reference pattern, and when the deviation exceeds an allowable range, it is determined that there is an abnormality in the nozzle touch.

CITATION LIST

Patent Literature

Patent Literature 1: JP2014-91259A

SUMMARY OF INVENTION

Technical Problem

In the method described in Patent Literature 1, the nozzle touch can be performed without requiring an observer and without incurring the work cost. Further, the method described in Patent Literature 1 is excellent in that not only misalignment but also various abnormalities such as insert of a foreign matter between the injection nozzle and the mold and resin leakage can be detected. However, there is a problem that it is necessary to obtain the reference pattern in advance and to prepare in advance.

In view of the above problems, the present disclosure proposes an injection device that can easily detect the presence or absence of misalignment between the center of an injection nozzle and the center of a sprue of a mold, an injection molding machine, and a nozzle touch method.

Other problems and novel features will become apparent from description of the present description and the accompanying drawings.

Solution to Problem

The present inventors have found that the above problems can be solved by adopting the following configurations. An injection device includes a heating cylinder, a screw provided in the heating cylinder, a screw driving device configured to drive the screw, and a nozzle touch device. The screw driving device includes a load cell configured to detect an injection pressure at the time of injection. In the injection device according to the present disclosure, the load cell is disposed at a position separated from an extension line of an axis of the screw. In the injection device according to the present disclosure, in a case where the injection nozzle is caused to touch a sprue of a mold by the nozzle touch device, a pressure of the load cell is monitored, and misalignment between the injection nozzle and the sprue is detected based on the pressure.

Advantageous Effects of Invention

According to the present disclosure, it is possible to provide an injection device that can easily detect the presence or absence of misalignment between an injection nozzle and a sprue of a mold, an injection molding machine including the injection device, and a nozzle touch method.

DESCRIPTION OF EMBODIMENTS

Figure 1:
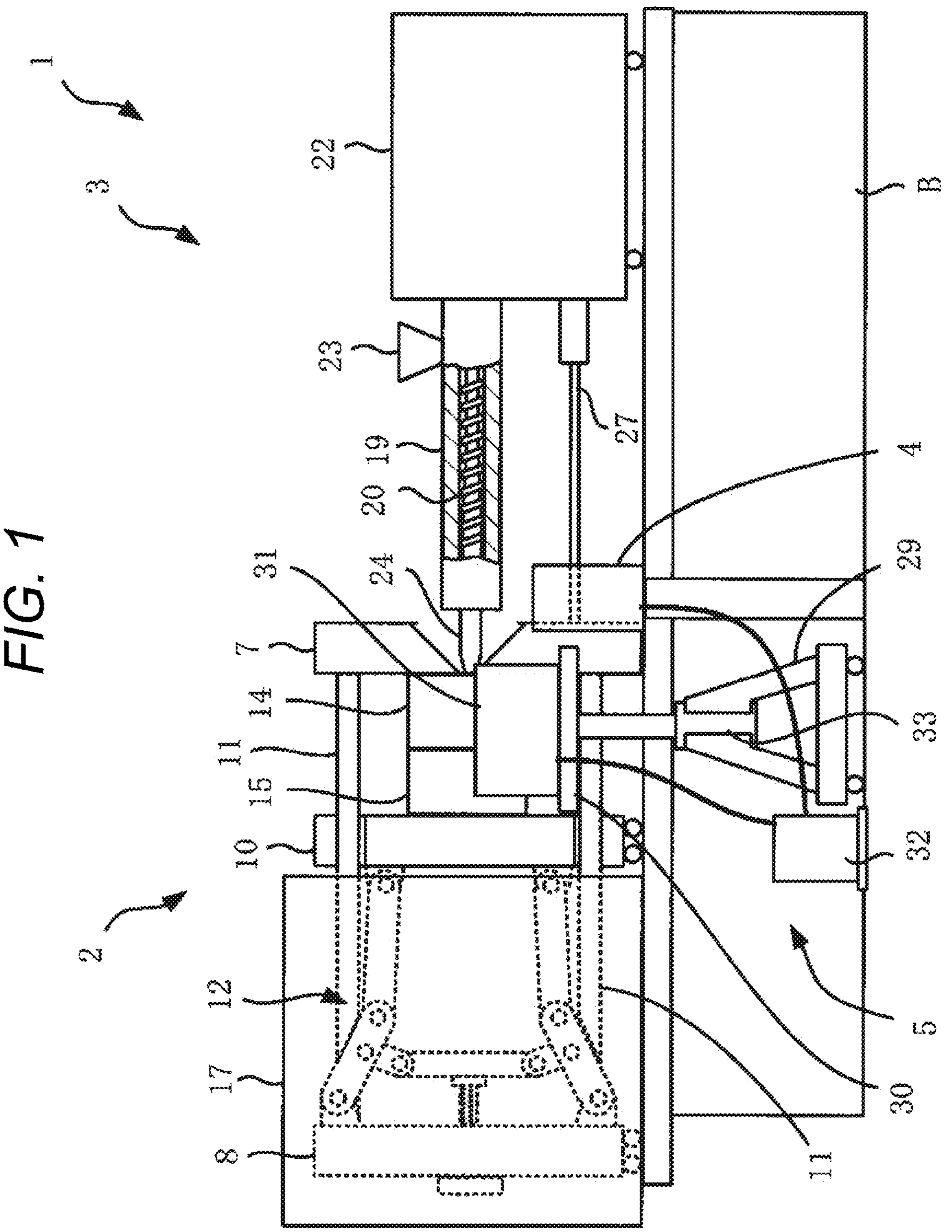
FIG. 1 is a front view of an injection molding machine and a subunit injection device according to the present embodiment.

Hereinafter, specific embodiments will be described in detail with reference to the drawings. However, the present invention is not limited to the following embodiment. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

The present embodiment will be described.

An injection device according to the present embodiment includes:

a heating cylinder having an injection nozzle at a tip end;

a screw provided in the heating cylinder;

a screw driving device configured to support the heating cylinder and drive the screw; and a nozzle touch device, in which the screw driving device includes a load cell at a position separated from an extension line of an axis of the screw, the load cell being configured to detect an injection pressure, and in which in a case where the injection nozzle is caused to touch a sprue of a mold by the nozzle touch device, a pressure of the load cell is monitored, and misalignment between the injection nozzle and the sprue is detected based on the pressure.

An injection molding machine according to the present embodiment includes:

a mold clamping device configured to clamp a mold; and an injection device configured to inject an injection material, the injection device including:

a heating cylinder having an injection nozzle at a tip end;

a screw provided in the heating cylinder;

a screw driving device configured to support the heating cylinder and drive the screw; and a nozzle touch device, in which the screw driving device includes a load cell at a position separated from an extension line of an axis of the screw, the load cell being configured to detect an injection pressure, and in which the injection molding machine is configured to monitor a pressure of the load cell in a case where the injection nozzle is caused to touch a sprue of a mold by the nozzle touch device and to detect misalignment between the injection nozzle and the sprue based on the pressure.

A nozzle touch method according to the present embodiment is a method for an injection device, the injection device including:

a heating cylinder having an injection nozzle at a tip end;

a screw provided in the heating cylinder;

a screw driving device configured to support the heating cylinder and drive the screw; and a nozzle touch device, a load cell being provided at a position separated from an extension line of an axis of the screw in the screw driving device, the load cell being configured to detect an injection pressure, the nozzle touch method including:

monitoring a pressure of the load cell in a case where the injection nozzle is caused to touch a sprue of a mold by the nozzle touch device and detecting misalignment between the injection nozzle and the sprue based on the pressure.

<Injection Molding Machine>

FIG. 1 shows an injection molding machine 1 according to the present embodiment and a subunit injection device 5 according to the present embodiment. The injection molding machine 1 according to the present embodiment is a horizontal-type injection molding machine 1. The injection molding machine 1 generally includes a mold clamping device 2 provided on a bed B, an injection device 3 configured to melt and inject an injection material, and a controller 4 configured to control the injection device 2 and the injection device 3. The subunit injection device 5 according to the present embodiment is provided on a lateral side of the mold clamping device 2.

<Mold Clamping Device>

The mold clamping device 2 includes a fixed platen 7 fixed on the bed B, a mold clamping housing 8 that is slidable on the bed B, and a movable platen 10 that is also slidable on the bed B. The fixed platen 7 and the mold clamping housing 8 are coupled by a plurality of, for example, four tie bars 11, 11 . . . . The movable platen 10 is slidable between the fixed platen 7 and the mold clamping housing 8. A mold clamping mechanism 12 is provided between the mold clamping housing 8 and the movable platen 10. The mold clamping mechanism 12 may be implemented by a direct pressure type mold clamping mechanism, that is, a mold clamping cylinder. In the present embodiment, the mold clamping mechanism 12 is implemented by a toggle mechanism.

The fixed platen 7 is provided with a fixed mold 14, and the movable platen 10 is provided with a movable mold 15. The mold clamping device 2 is covered with a safety cover 17, and the fixed platen 7, the fixed mold 14, and the like are exposed. The subunit injection device 5 according to the present embodiment is connected to the exposed fixed mold 14 from a side thereof.

<Injection Device>

The injection device 3, which is a part of the injection molding machine 1, includes a heating cylinder 19, a screw 20 provided in the heating cylinder 19, and a screw driving device 22 configured to drive the screw 20. A hopper 23 is provided in the vicinity of a rear end portion of the heating cylinder 19. An injection nozzle 24 is provided at a tip end of the heating cylinder 19. A nozzle touch device 27 is provided between the screw driving device 22 and the fixed platen 7. When the nozzle touch device 27 is driven, the entire injection device 3 slides in a direction toward or away from the fixed platen 7. Accordingly, the injection nozzle 24 touches the fixed mold 14 or is separated from the fixed mold 14. The screw driving device 22 of the injection device 3 will be described later.

<Subunit Injection Device>

In the present embodiment, the injection device is preferably a subunit injection device, which is adapted to be additionally connected to an injection molding machine.

As shown in FIG. 1, the subunit injection device 5 according to the present embodiment includes a movable leg portion 29, a base portion 30 mounted on the leg portion 29, an injection device main body 31 mounted on the base portion 30, and a controller 32 configured to control the subunit injection device 5. The leg portion 29 includes a stopper (not shown) and is configured to be fixed to the floor at a desired position. The leg portion 29 is provided with a lifting device 33, allowing for adjustment of a height of the injection device main body 31.

Figure 2:
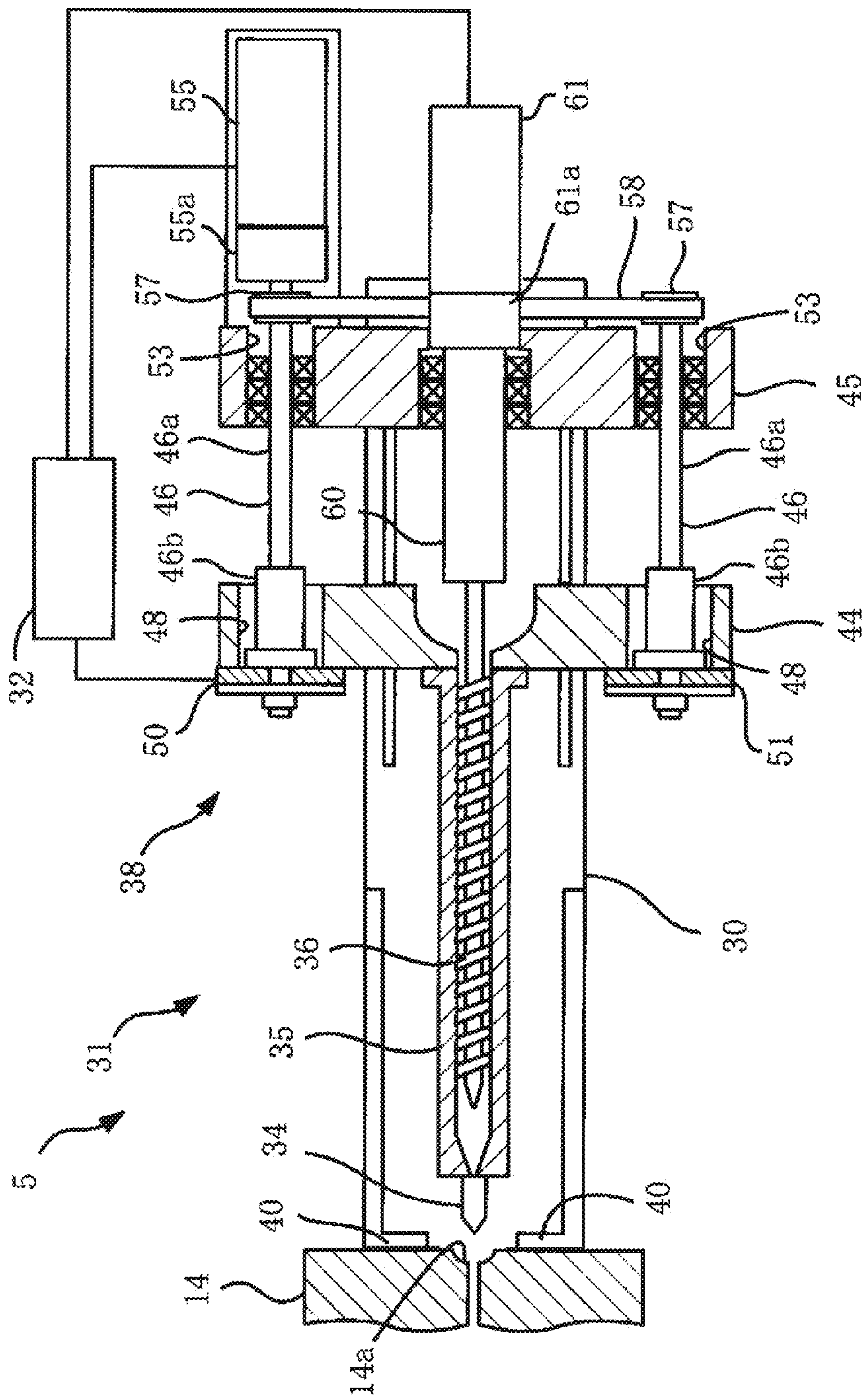
FIG. 2 is a top sectional view showing the subunit injection device according to the present embodiment.

FIG. 2 is a top sectional view of the subunit injection device 5. The injection device main body 31 is placed on the base portion 30. The injection device main body 31 includes a heating cylinder 35 provided with an injection nozzle 34 at a tip end, a screw 36 provided in the heating cylinder 35, and a screw driving device 38. The screw driving device 38 is slidably provided on the base portion 30. As described in detail below, the screw driving device 38 is configured to support the heating cylinder 35 and drive the screw 36. The base portion 30 includes connection portions 40, 40, and is fixed to the fixed mold 14. Although not shown, a nozzle touch device is provided between the base portion 30 and the screw driving device 38, and the entire injection device main body 31 is slid via the screw driving device 38 to cause the injection nozzle 34 to touch the sprue 14*a* of the fixed mold 14.

<Screw Driving Device>

The screw driving device 38 includes a front plate 44 to which the heating cylinder 35 is fixed, and an intermediate plate 45 provided parallel to the front plate 44. The front plate 44 and the intermediate plate 45 are connected by two ball screw mechanisms 46. More specifically, attachment holes 48, 48 are formed in the front plate 44. The ball screw mechanisms 46, 46 include respective ball screws 46*a*, 46*a* and ball nuts 46*b*, 46*b*. The ball nuts 46*b*, 46*b* are respectively provided in the attachment holes 48, 48 of the front plate 44. One of the ball nuts 46*b* is fixed to a load cell 50, and the other is fixed to a dummy load cell 51. The load cell 50 and the dummy load cell 51 are fixed to the front plate 44.

Through holes 53, 53 are formed in the intermediate plate 45. The ball screws 46*a*, 46*a* are rotatably supported in the through holes 53, 53 in a state where movement in an axial direction is restricted. The ball screws 46*a*, 46*a* are provided with pulleys 57, 57. A timing belt 58 is wound around the pulleys 57, 57. An injection motor 55 including a speed reducer 55*a* is provided on the intermediate plate 45, and rotates one ball screw 46*a*. Accordingly, when the injection motor 55 is driven, the ball screws 46*a*, 46*a* are synchronously rotated, and the intermediate plate 45 slides in a direction toward or away from the front plate 44.

In the intermediate plate 45, a screw support portion 60 is provided, which is rotatable and is configured to support the screw 36 at its rear end portion. Therefore, when the injection motor 55 is driven to slide the intermediate plate 45 in a direction toward the front plate 44, the screw 36 is driven in the axial direction to inject the injection material. The intermediate plate 45 includes a plasticizing motor 61 having a speed reducer 61*a*. Although not shown, the rotation of the speed reducer 61*a* is transmitted to the screw support portion 60 via a transmission mechanism, so that the screw 36 rotates. That is, the injection material is plasticized.

As described above, in the present embodiment, it is preferable that the screw driving device includes the front plate that supports the heating cylinder at an end portion and the intermediate plate that rotatably supports the screw, and the load cell is provided on the front plate.

As shown in FIG. 2, the load cell 50, the injection motor 55, and the plasticizing motor 61 are connected to the controller 32. Since the subunit injection device 5 (see FIG. 1) needs to be driven in cooperation with the injection molding machine 1, the controller 32 of the subunit injection device 5 is connected to the controller 4 of the injection molding machine 1 by a signal line.

<Detection of Injection Pressure>

Figure 3:
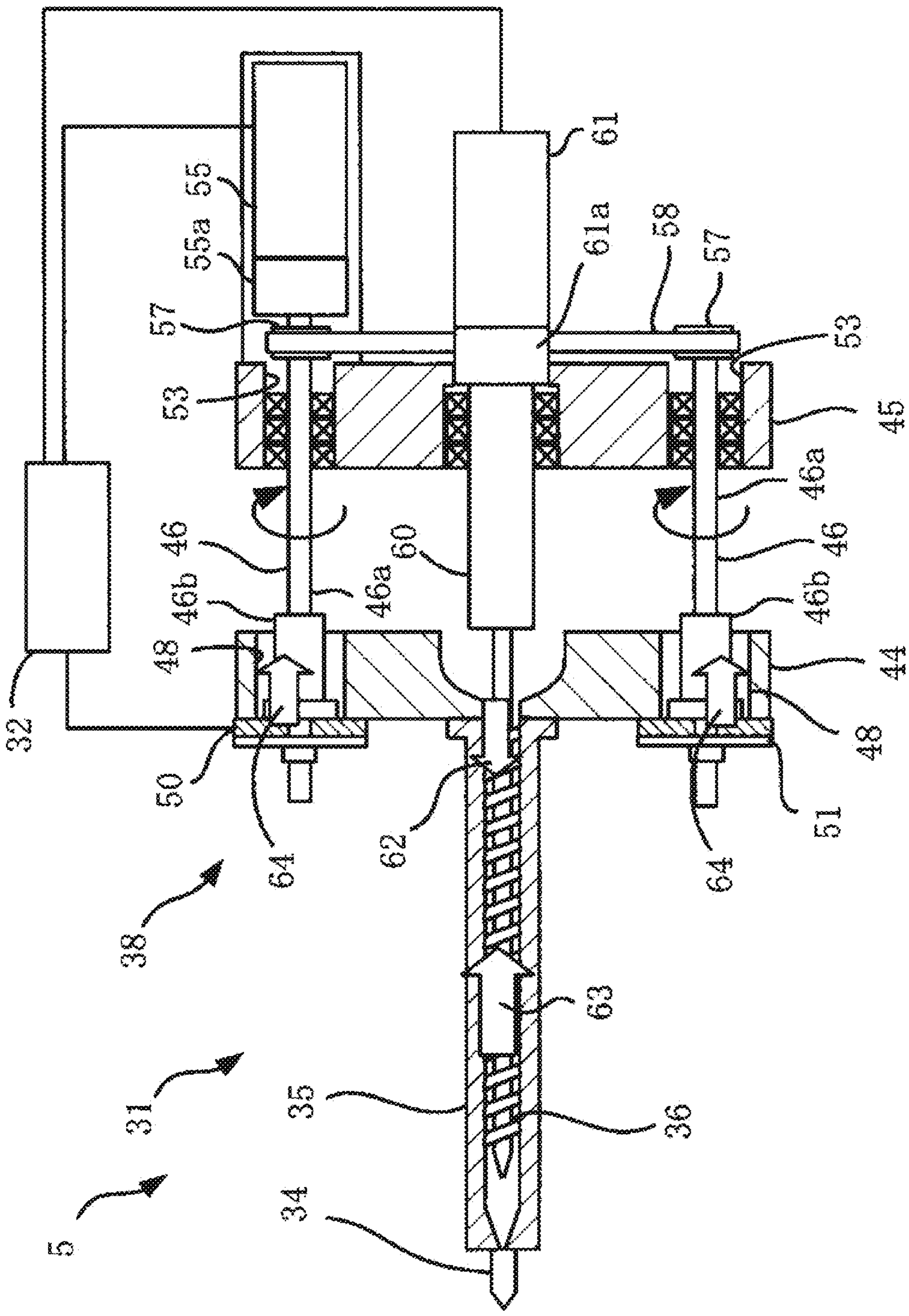
FIG. 3 is a top sectional view showing the subunit injection device according to the present embodiment.

The nozzle touch method according to the present embodiment detects misalignment between the injection nozzle 34 and the sprue 14*a* of the fixed mold 14 based on the pressure detected by the load cell 50 as described below. The load cell 50 is originally used to detect the injection pressure at the time of injection, as described below. That is, the injection motor 55 is driven at the time of injection. Then, as shown in FIG. 3, the ball screws 46*a*, 46*a* rotate, the ball screws 46*a*, 46*a* move in the axial direction with respect to the ball nuts 46*b*, 46*b*, and the intermediate plate 45 is slid. As indicated by reference numeral 62, the screw 36 is driven forward via the screw support portion 60. A pressing force 63 acts on the screw 36 due to the pressure of the injection material in the heating cylinder 35. The pressing force 63 acts on the load cell 50 via the intermediate plate 45, the ball screw 46*a*, and the ball nut 46*b*. A tensile force 64 acts on the load cell 50. That is, the injection pressure is detected.

<Nozzle Touch Method according to Present Embodiment>

The nozzle touch method according to the present embodiment will be described. The controller 32 starts monitoring the pressure detected by the load cell 50. The controller 32 drives a nozzle touch device (not shown) to drive the injection device main body 31 toward the fixed mold 14. Eventually, the injection nozzle 34 touches the sprue 14*a* of the fixed mold 14. If an axis of the injection nozzle 34 coincides with the center of the sprue 14*a*, even if a touch force acts on the front plate 44 via the injection nozzle 34 and the heating cylinder 35, the pressure is hardly detected in the load cell 50. This is because a distance between the front plate 44 and the intermediate plate 45 does not change during forward and backward movement of the injection device main body 31, so that no pressure is applied to the load cell 50.

Figure 4:
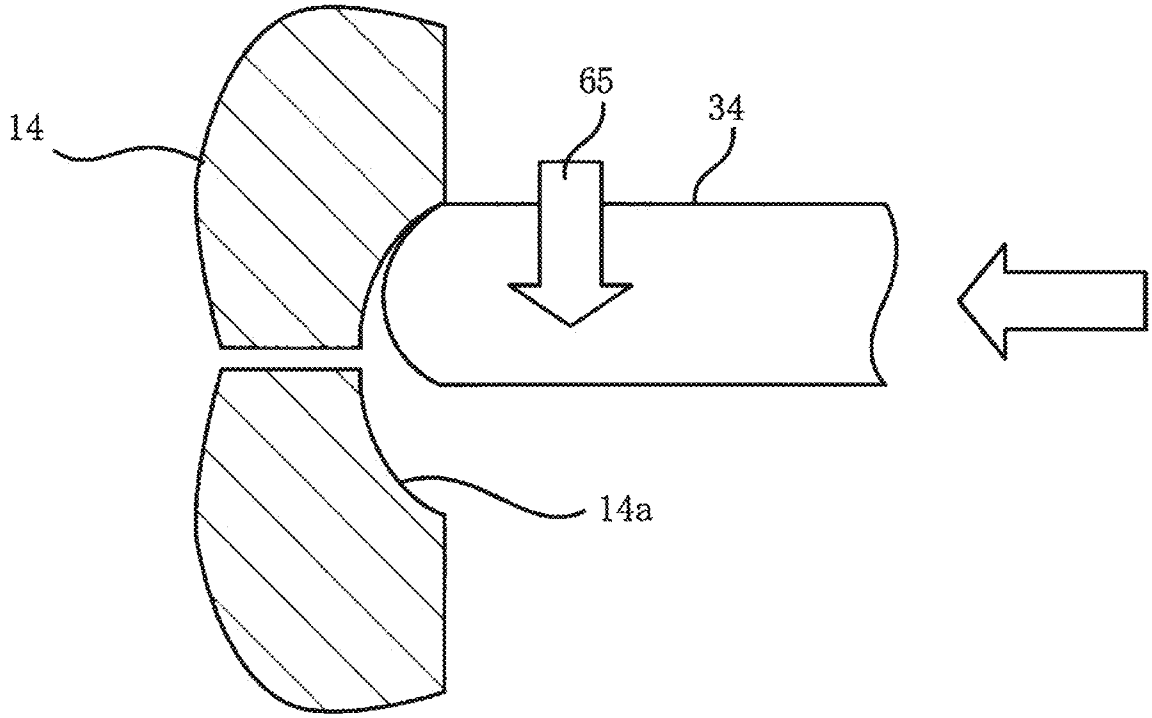
FIG. 4 is a front view schematically showing a mold and an injection nozzle that touches a sprue of the mold.
Figure 5:
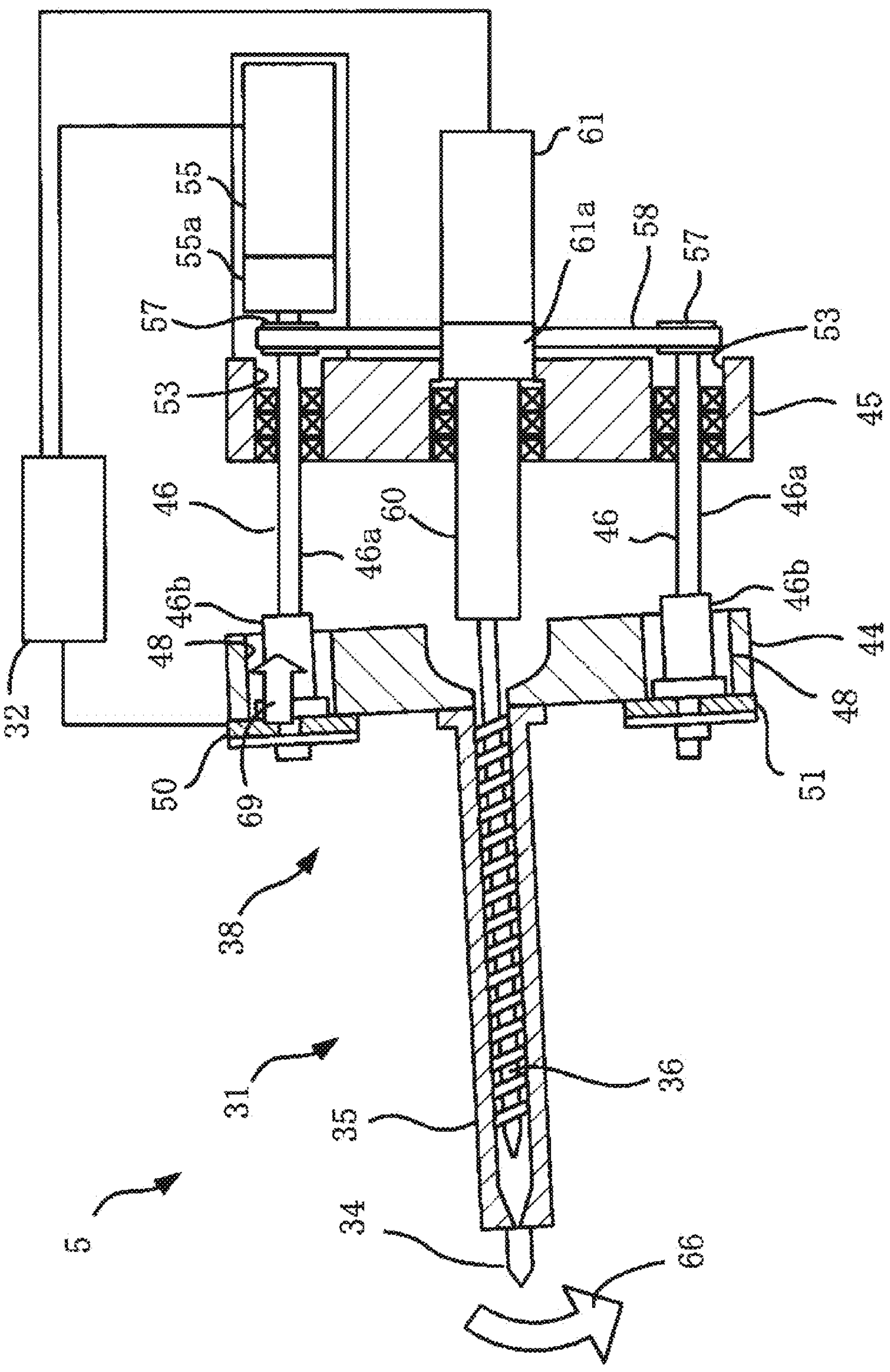
FIG. 5 is a top sectional view showing a part of the subunit injection device according to the present embodiment.

However, if the axis of the injection nozzle 34 is deviated from the center of the sprue 14*a* as shown in FIG. 4, that is, if misalignment occurs, a tip end of the injection nozzle 34 touches a concave surface of the sprue 14*a* and then is guided by the concave surface shifts in a lateral direction. That is, as shown in FIG. 4, a lateral force 65 acts on the injection nozzle 34. Then, as shown in FIG. 5, a moment 66 acts on the heating cylinder 35 and the front plate 44. A pressure due to a tensile force 69 is detected in the load cell 50 by the moment 66. That is, the pressure is detected as if the injection pressure was detected in the load cell 50. Accordingly, the controller 32 determines that misalignment has occurred.

The reason why the occurrence of the misalignment can be detected in the load cell 50 in this way is that the occurrence of the moment 66 can be detected by the load cell 50. This is because the load cell 50 is disposed at a position separated from an extension line of the axis of the screw 36.

Figure 6:
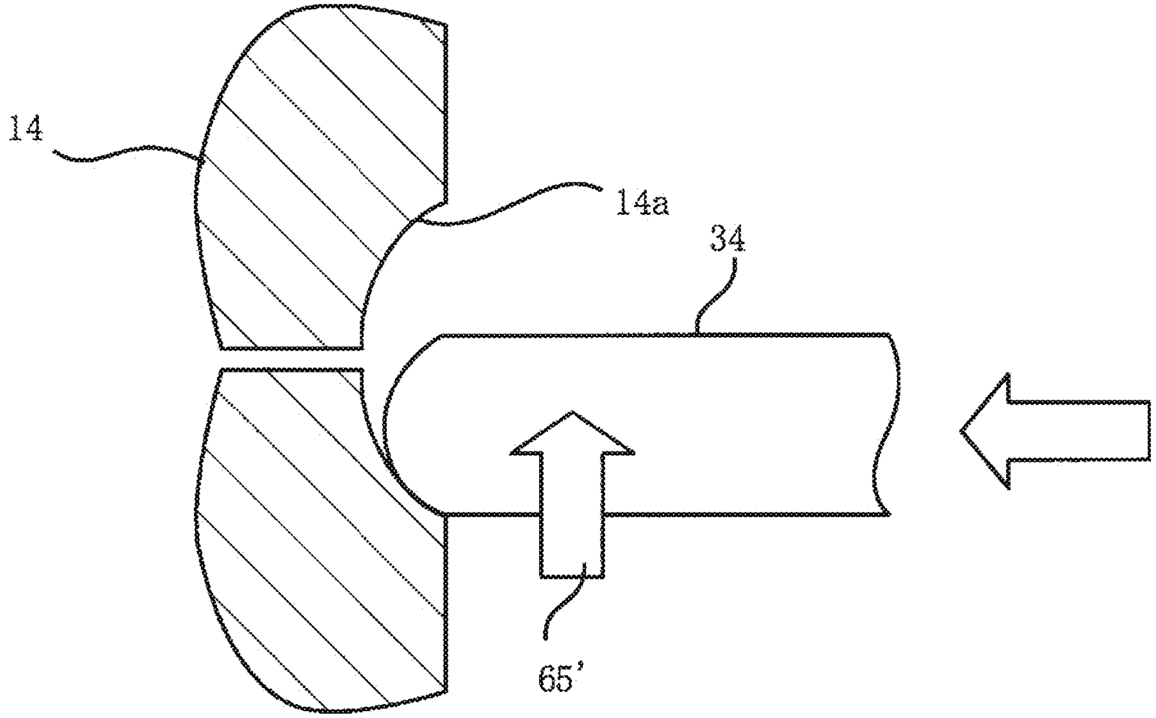
FIG. 6 is a front view schematically showing the mold and the injection nozzle that touches the sprue of the mold.

As shown in FIG. 6, when the axial of the injection nozzle 34 is deviated in an opposite direction with respect to the center of the sprue 14*a*, the moment 66 acts in an opposite rotation direction in FIG. 5. In this case, a compressive force acts on the load cell 50. Then, a negative pressure is detected as if a negative injection pressure was applied to the load cell 50. The controller 32 determines that misalignment has occurred.

As described above, when the pressure is detected in the load cell 50, the controller 32 can determine that the misalignment has occurred, and the controller 32 can also detect a direction of the misalignment based on whether the pressure is positive or negative. Further, the controller 32 can evaluate the magnitude of the misalignment based on the magnitude of the pressure.

<Screw Driving Device of Injection Device According to Present Embodiment>

The injection device 3 configuring the injection molding machine 1 (see FIG. 1) according to the present embodiment can also perform the nozzle touch method according to the present embodiment, and can detect misalignment between the injection nozzle 24 and a sprue (not shown) of the fixed mold 14. The screw driving device 22 of the injection device 3 will be described.

Figure 7:
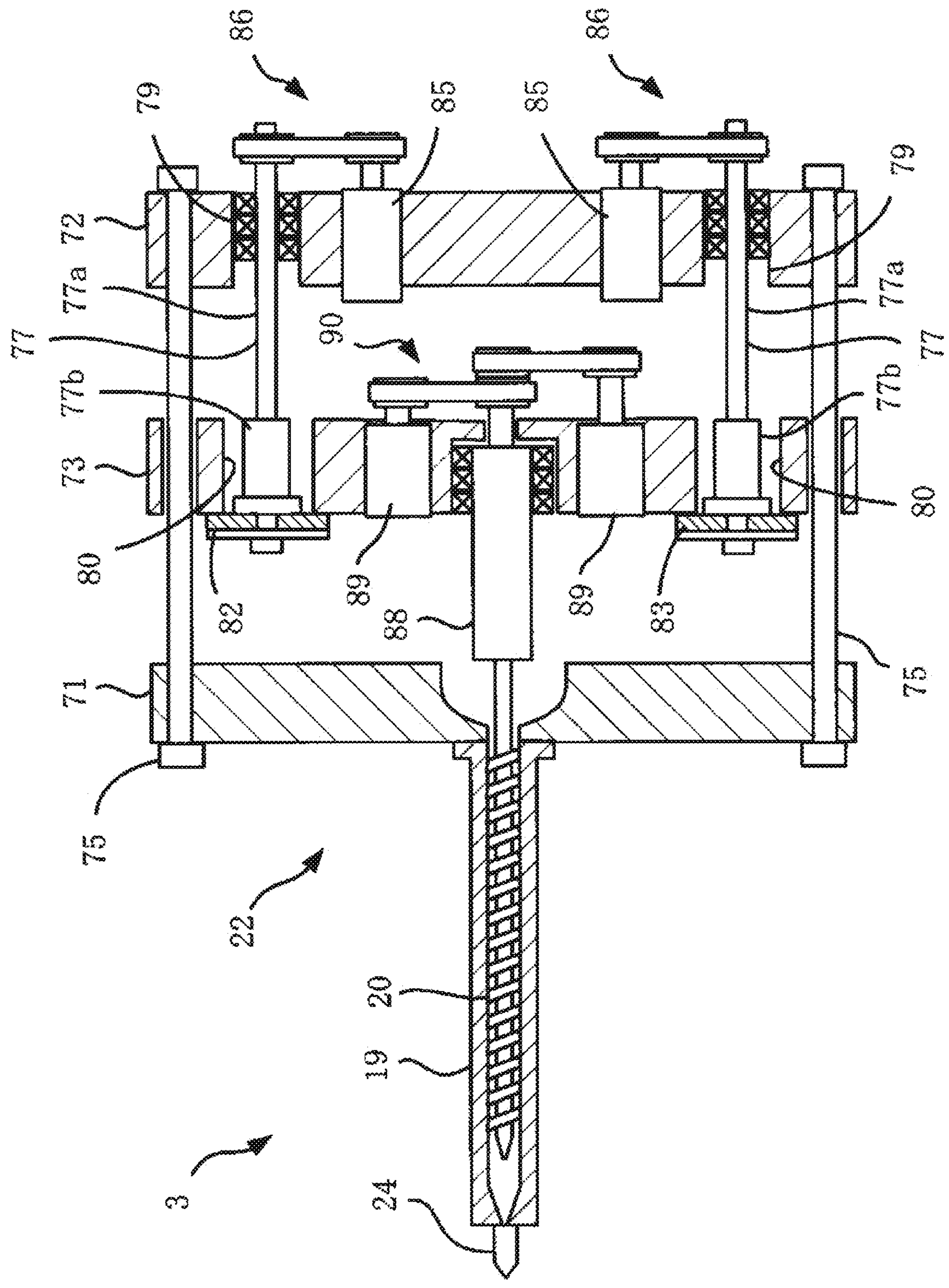
FIG. 7 is a top sectional view showing the injection device according to the present embodiment.

As shown in FIG. 7, the screw driving device 22 of the injection device 3 includes a front plate 71, a rear plate 72 provided parallel to and spaced from the front plate 71, and an intermediate plate 73 provided between the front plate 71 and the rear plate 72. The front plate 71 and the rear plate 72 are coupled by a plurality of guide rods 75, 75. The intermediate plate 73 is guided by the guide rods 75, 75 and is slidable. Although FIG. 8 shows the intermediate plate 73, two guide rods 75, 75 are provided in the present embodiment.

The intermediate plate 73 and the rear plate 72 are coupled by four ball screw mechanisms 77, 77. Although only two ball screw mechanisms 77, 77 are shown in FIG. 7, four ball screw mechanisms 77, 77, . . . are provided as shown in FIG. 8. As shown in FIG. 7, through holes 79, 79, . . . are formed in the rear plate 72, and ball screws 77*a*, 77*a* of the ball screw mechanisms 77, 77, . . . are rotatably supported in a state where movement in the axial direction is restricted. Attachment holes 80, 80, . . . are formed in the intermediate plate 73, and ball nuts 77*b*, 77*b*, . . . of the ball screw mechanisms 77, 77, . . . are inserted into the attachment holes 80, 80, . . . .

Figure 8:
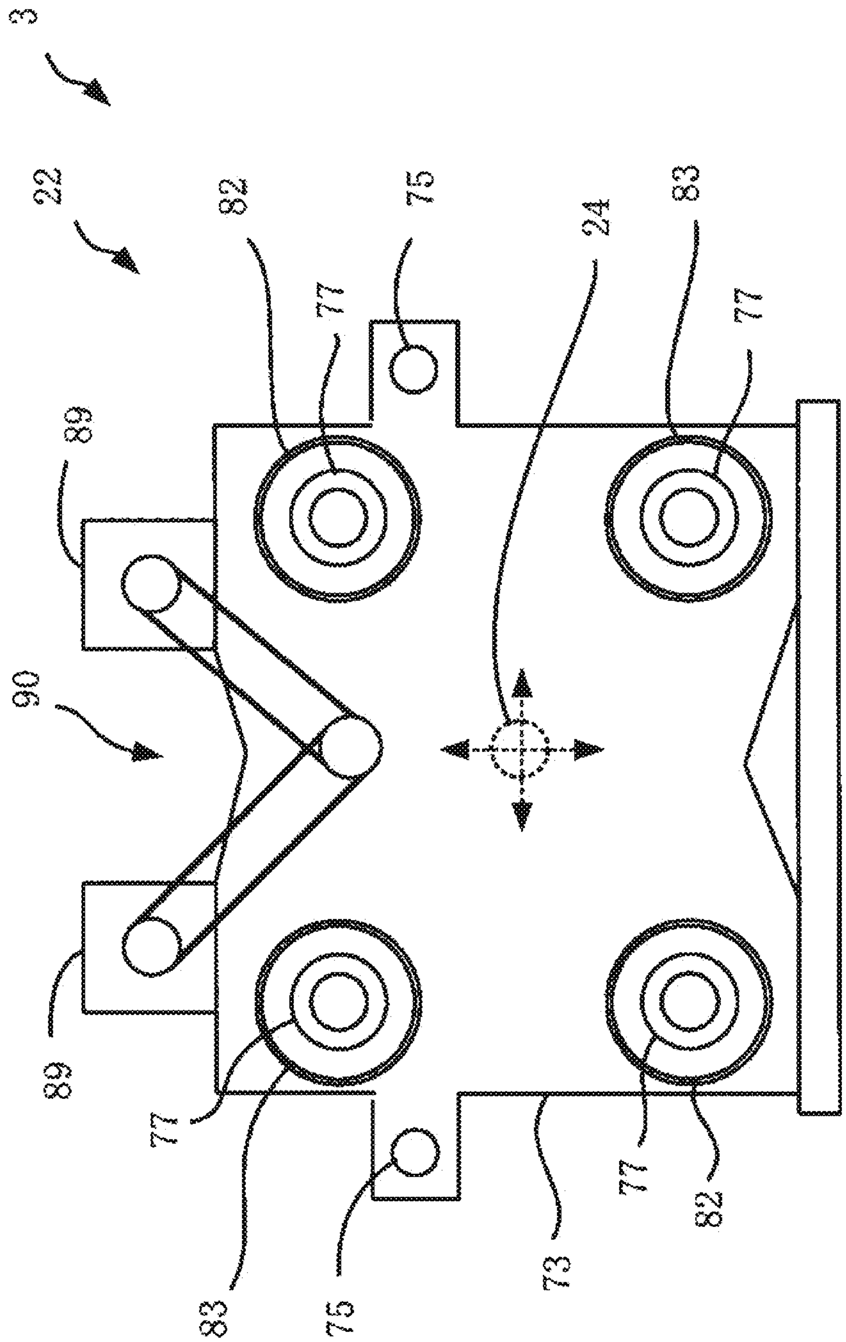
FIG. 8 is a side view showing an intermediate plate constituting a screw driving device of the injection device according to the present embodiment.

As shown in FIG. 8, of the four ball nuts 77*b*, 77*b*, . . . , two ball nuts 77*b*, 77*b* arranged diagonally are provided with load cells 82, 82, and the other two ball nuts 77*b*, 77*b* are provided with dummy load cells 83, 83, respectively. The load cells 82, 82 and the dummy load cells 83, 83 are fixed to the intermediate plate 73.

The rear plate 72 is provided with two injection motors 85, 85, and ball screws 77*a*, 77*a*, . . . are rotated by power transmission mechanisms 86, 86. Therefore, when the injection motors 85, 85 are driven, the intermediate plate 73 and the screw 20 are driven in the axial direction. A screw support portion 88 coupled to the screw 20 is rotatably provided on the intermediate plate 73. The intermediate plate 73 is provided with two plasticizing motors 89, 89 and the screw 20 is rotated by a power transmission mechanism 90 via the screw support portion 88.

Although the injection nozzle 24 is indicated by a dotted line in FIG. 8, there is a possibility that the injection nozzle 24 is misaligned in upper-lower and left-right directions. In the injection device 3 according to this embodiment, the load cells 82, 82 are provided corresponding to the two ball screw mechanisms 77, 77 arranged diagonally among the four ball screw mechanisms 77, 77, . . . , so that the misalignment in the upper-lower direction and the misalignment in the left-right direction can be detected.

<Subunit Injection Device According to Second Embodiment>

The present embodiment can be variously modified. For example, in the present embodiment, a screw driving device may include a front plate that supports a heating cylinder at an end portion and an intermediate plate that rotatably supports a screw, and a load cell may be provided on the intermediate plate.

Figure 9:
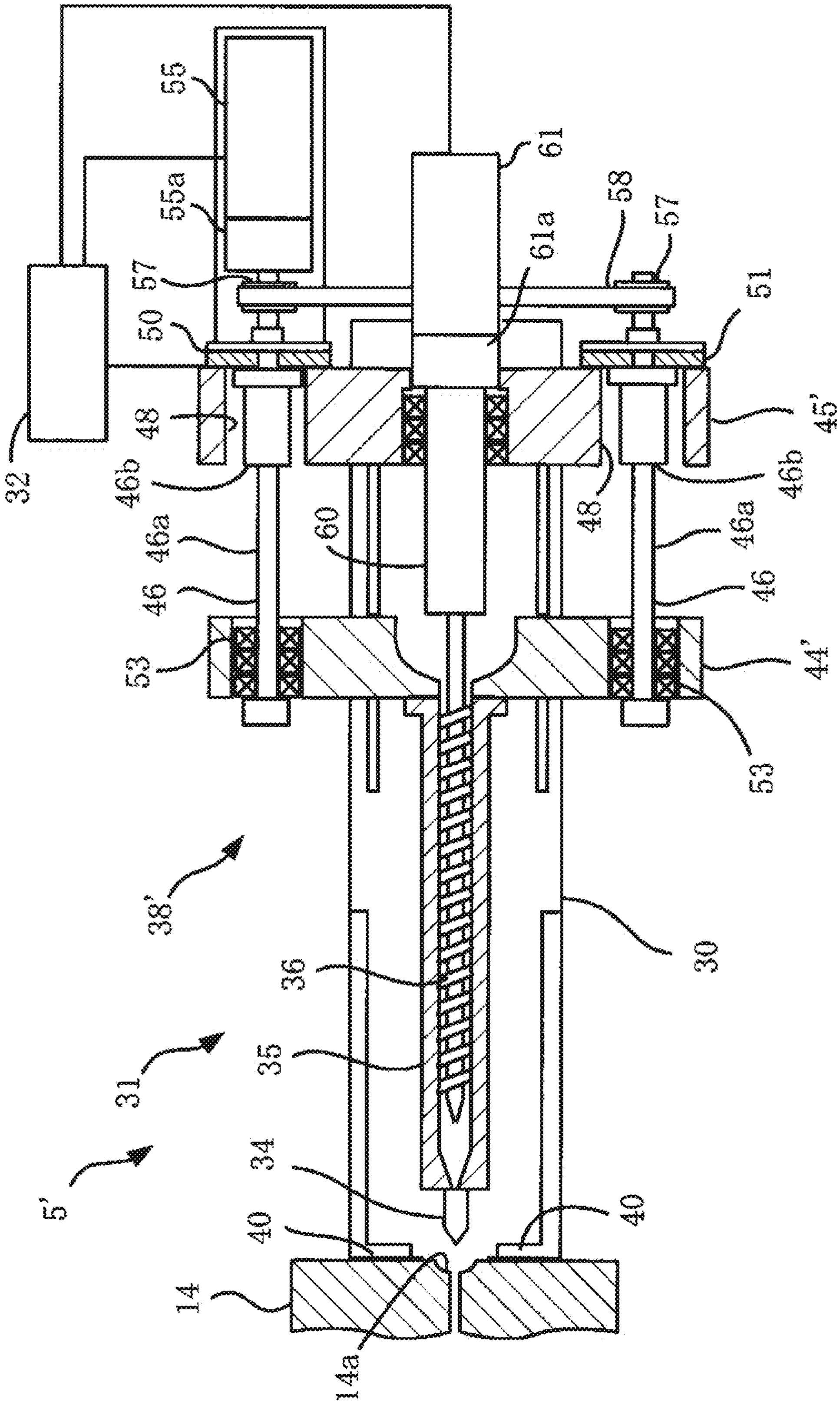
FIG. 9 is a top sectional view showing a subunit injection device according to a second embodiment.

FIG. 9 shows a subunit injection device 5' according to a second embodiment. In the subunit injection device 5', a screw driving device 38' is modified, and ball nuts 46*b*, 46*b* of ball screw mechanisms 46, 46 are provided on an intermediate plate 45'. Accordingly, the load cell 50 is provided on the intermediate plate 45'. In the subunit injection device 5' according to the second embodiment, if misalignment occurs between the injection nozzle 34 and the sprue 14*a* of the fixed mold 14 at the time of nozzle touch, a moment acts on the heating cylinder 35 and a front plate 44'. In this case, a tensile force acts on one ball screw mechanism 46 and a pressing force acts on the other ball screw mechanism 46, and either positive or negative pressure is detected in the load cell 50. That is, misalignment can be detected.

Other Modifications

In both of the subunit injection devices 5 and 5' (see FIGS. 2 and 9) according to the first and second embodiments described above, the load cell 50 is provided in one of the two ball screw mechanisms 46, 46 and the dummy load cell 51 is provided in the other. However, the load cell 50 may be provided in both of the two ball screw mechanisms 46, 46. That is, two load cells 50, 50 may be provided in the front plate 44 or the intermediate plate 45. In this way, misalignment can be detected more accurately. As shown in FIGS. 7 and 8, the injection device 3 according to the present embodiment has been described as including four ball screw mechanisms 77, 77, . . . , of which only two ball screw mechanisms 77, 77 are provided with the load cells 82, 82. However, the other two ball screw mechanisms 77, 77 may also be provided with the load cells 82, 82 instead of the dummy load cells 83, 83.

As described above, in the present embodiment, the load cells are preferably provided at two or more different positions in the screw driving device. Further, as the nozzle touch method, a method is also preferable in which the load cells are provided at two or more different positions in the screw driving device, and the pressure of the load cells at the two or more positions is monitored to detect the misalignment between the injection nozzle and the sprue.

The subunit injection device 5 according to the present embodiment described with reference to FIG. 1 has been described as being provided on the lateral side of the mold clamping device 2 of the injection molding machine 1 according to the present embodiment. However, the subunit injection device 5 may be provided above the mold clamping device 2. Even in such a case, the nozzle touch method according to the present embodiment can naturally be performed.

Although the invention made by the present inventors is specifically described based on the embodiments, it is needless to say that the present invention is not limited to the embodiments described above, and various modifications can be made without departing from the scope of the invention. The plurality of examples described above may be appropriately combined.

INDUSTRIAL APPLICABILITY

According to the present disclosure, it is possible to provide an injection device that can easily detect the presence or absence of misalignment between an injection nozzle and a sprue of a mold, an injection molding machine, and a nozzle touch method.

Although the present invention has been described in detail with reference to specific embodiments, it will be apparent to those skilled in the art that various changes and modifications can be made without departing from the spirit and scope of the present invention.

The present application is based on Japanese Patent Application No. 2021-183864 filed on Nov. 11, 2021, and the contents thereof are incorporated herein as reference.

REFERENCE SIGNS LIST

1 Injection molding machine
2 Mold clamping device
3 Injection device
4 Controller
5 Subunit injection device
7 Fixed platen
8 Mold clamping housing
10 Movable platen
11 Tie bar
12 Mold clamping mechanism

14 Fixed mold
**14*a*** Sprue
15 Movable mold
17 Safety cover
19 Heating cylinder
20 Screw
22 Screw driving device
23 Hopper
24 Injection nozzle
27 Nozzle touch device
29 Leg portion
30 Base portion
31 Injection device main body
32 Controller
33 Lifting device
34 Injection nozzle
35 Heating cylinder
36 Screw
38 Screw driving device
40 Connection portion
44 Front plate
45 Intermediate plate
46 Ball screw mechanism
**46*a*** Ball screw
**46*b*** Ball nut
48 Attachment hole
50 Load cell
51 Dummy load cell
53 Through hole
55 Injection motor
**55*a*** Speed reducer
57 Pulley
58 Timing belt
60 Screw support portion
61 Plasticizing motor
**61*a*** Speed reducer
62 Driving direction
63 Pressing force
64 Tensile force
65, 65' Force
66 Moment
69 Tensile force
71 Front plate
72 Rear plate
73 Intermediate plate
75 Guide rod
77 Ball screw mechanism
**77*a*** Ball screw
**77*b*** Ball nut
79 Through hole
80 Attachment hole
82 Load cell
83 Dummy load cell
85 Injection motor
86 Power transmission mechanism
88 Screw support portion
89 Plasticizing motor
90 Power transmission mechanism
B Bed
5' Subunit injection device
38' Screw driving device
44' Front plate
45' Intermediate plate

The invention claimed is:

1. An injection device comprising:

a heating cylinder having an injection nozzle at a tip end;

a screw provided in the heating cylinder;

a screw driving device configured to support the heating cylinder and drive the screw; and a nozzle touch device, wherein the screw driving device includes a load cell at a position separated from an extension line of an axis of the screw by a distance greater than a distance from the axis to an outer surface of the heating cylinder at an end portion opposite the tip end, the load cell being configured to detect an injection pressure, and wherein in a case where the injection nozzle is caused to touch a sprue of a mold by the nozzle touch device, a pressure of the load cell is monitored, and misalignment between the injection nozzle and the sprue is detected based on the pressure.

2. The injection device according to claim 1, wherein the injection device is a subunit injection device adapted to be additionally connected to an injection molding machine.

3. The injection device according to claim 1, wherein the load cell is provided at two or more different positions in the screw driving device.

4. The injection device according to claim 1, wherein the screw driving device includes:

a front plate supporting the heating cylinder at the end portion opposite the tip end; and an intermediate plate rotatably supporting the screw, and wherein the load cell is provided on the front plate.

5. The injection device according to claim 1, wherein the screw driving device includes:

a front plate supporting the heating cylinder at the end portion opposite the tip end; and an intermediate plate rotatably supporting the screw, and wherein the load cell is provided on the intermediate plate.

6. An injection molding machine comprising:

a mold clamping device configured to clamp a mold; and an injection device configured to inject an injection material, the injection device including:

a nozzle touch device;

a heating cylinder having an injection nozzle at a tip end;

a screw provided in the heating cylinder;

a screw driving device configured to support the heating cylinder and drive the screw, the screw driving device including a load cell at a position separated from an extension line of an axis of the screw by a distance greater than a distance from the axis to an outer surface of the heating cylinder at an end portion opposite the tip end, the load cell being configured to detect an injection pressure; and a controller configured to monitor a pressure of the load cell in a case where the injection nozzle is caused to touch a sprue of a mold by the nozzle touch device and to detect misalignment between the injection nozzle and the sprue based on the pressure.

7. The injection molding machine according to claim 6, wherein the load cell is provided at two or more different positions in the screw driving device.

8. The injection molding machine according to claim 6, wherein the screw driving device includes:

a front plate supporting the heating cylinder at the end portion opposite the tip end; and an intermediate plate rotatably supporting the screw, and wherein the load cell is provided on the front plate.

9. The injection molding machine according to claim 6, wherein the screw driving device includes:

a front plate supporting the heating cylinder at the end portion opposite the tip end; and an intermediate plate rotatably supporting the screw, and wherein the load cell is provided on the intermediate plate.

10. A nozzle touch method for an injection device, the injection device including:

a heating cylinder having an injection nozzle at a tip end;

a screw provided in the heating cylinder;

a screw driving device configured to support the heating cylinder and drive the screw; and a nozzle touch device, the screw driving device being provided with a load cell at a position separated from an extension line of an axis of the screw by a distance greater than a distance from the axis to an outer surface of the heating cylinder at an end portion opposite the tip end, the load cell being configured to detect an injection pressure, the nozzle touch method comprising:

monitoring a pressure of the load cell in a case where the injection nozzle is caused to touch a sprue of a mold by the nozzle touch device and detecting misalignment between the injection nozzle and the sprue based on the pressure.

11. The nozzle touch method according to claim 10, wherein the injection device is a subunit injection device adapted to be additionally connected to an injection molding machine.

12. The nozzle touch method according to claim 10, wherein the load cell is provided at two or more different positions in the screw driving device, and wherein the method comprises monitoring a pressure of the load cell at the two or more positions to detect misalignment between the injection nozzle and the sprue.

13. The injection device according to claim 1, wherein the load cell is arranged such that when the injection nozzle touches the sprue, substantially no pressure is applied to the load cell if the injection nozzle and the sprue are aligned, and a force due to a moment acting on the screw is applied to the load cell if the injection nozzle and the sprue are misaligned.

14. The injection molding machine according to claim 6, wherein the load cell is arranged such that when the injection nozzle touches the sprue, substantially no pressure is applied to the load cell if the injection nozzle and the sprue are aligned, and a force due to a moment acting on the screw is applied to the load cell if the injection nozzle and the sprue are misaligned.

15. The nozzle touch method according to claim 10, wherein the load cell is arranged such that when the injection nozzle touches the sprue, substantially no pressure is applied to the load cell if the injection nozzle and the sprue are aligned, and a force due to a moment acting on the screw is applied to the load cell if the injection nozzle and the sprue are misaligned.

* * * * *